United States Patent [19]
Doyle et al.

[11] 3,846,614
[45] Nov. 5, 1974

[54] ELECTRIC FLUID HEATING UNIT

[75] Inventors: Edward J. Doyle, Hatboro; Richard S. Bagwell, Jr., Lancaster, both of Pa.

[73] Assignee: Schick Incorporated, Lancaster, Pa.

[22] Filed: May 2, 1973

[21] Appl. No.: 356,569

Related U.S. Application Data

[62] Division of Ser. No. 76,454, Sept. 20, 1970, Pat. No. 3,758,002.

[52] U.S. Cl............ 219/302, 122/146 HA, 219/214, 219/301, 219/305
[51] Int. Cl.......... H05b 1/00, B67d 5/62, F24h 1/12
[58] Field of Search ........... 219/301, 302, 303, 304, 219/305, 296–299, 214; 122/146 R, 146 HE, 146 HA; 239/133–136

[56] References Cited
UNITED STATES PATENTS

| | | | |
|---|---|---|---|
| 941,215 | 11/1909 | Wade | 219/303 |
| 958,846 | 5/1910 | Wood | 219/297 |
| 1,654,551 | 1/1928 | Muhleisen | 219/298 X |
| 2,833,909 | 5/1958 | Levey | 219/298 |
| 3,358,885 | 12/1967 | Flowers | 219/214 UX |
| 3,443,060 | 5/1969 | Smith | 219/302 |
| 3,485,245 | 12/1969 | Lahr et al. | 219/302 UX |
| 3,710,985 | 1/1973 | Baum | 219/302 X |

*Primary Examiner*—A. Bartis

[57] ABSTRACT

A unit for electrically heating and dispensing products from pressurized containers receives a pressurized container, and, upon actuation of the container valve, directs the product through a series of passages, including one or more product heating chambers. Each heating chamber is formed in part by channels on an exterior surface of a relatively massive heat sink unit having an electrical resistance heating element associated therewith. The channels are sealed by a cover assembly comprising a first member of relatively thin plastic material adapted to withstand the temperature of the product, and a second member of relatively thick flexible material coextensive with and superimposed over the first member which urges the first member into sealing engagement with the margins of the channel.

2 Claims, 17 Drawing Figures

ELECTRIC FLUID HEATING UNIT

This is a division of application Ser. No. 76,454, filed Sept. 29, 1970, now U.S. Pat. No. 3,758,002, granted Sept. 11, 1973.

BACKGROUND OF THE INVENTION

The present invention relates to dispensable products, product containers, and to apparatuses and methods for heating and dispensing such products, from pressurized containers. More particularly, the invention is concerned with dispenser units wherein two or more chambers are provided for heating the products so that such plural chambers may be used simultaneously to heat a portion of one individual product, and wherein only one or less than all of the chambers may be used to heat a particular product with the remaining chamber or chambers being used to heat other products.

Recently, dispensers have been made available which are adapted to heat products being dispensed from pressurized containers, such as dispensers for shaving cream and the like. As the public has become aware of the availability of such devices, and as members of the public become accustomed to the concept of using heated cosmetic products, including those applied professionally, such as those in barber shops, beauty parlors and the like, there has been an increased demand for products which can be applied in a heated condition and for effective, economical and reliable product heaters and dispensers which may be used in the home with a variety of products. To date, the emphasis on such product dispensers has generally centered around foamable shaving creams and like shaving products, and most of the efforts in the field of heating and dispensing products have been centered in this area. Such foam products are normally characterized by relatively good heat insulation but low density and heat capacity. Accordingly, the use of dispensers intended for heating shaving lathers, as a practical matter, has generally been confined to the use of these and similar products. Since there has thus been a need for dispensing only a single product, the problem of dispensing a sequence of different products, particularly at different or potentially different rates, has not been presented.

However, in the field of cosmetics and other products primarily intended to be used by women, it is not uncommon for a number of products to be used in succession, such as, for example, a user may wish to apply a cleansing or conditioning cream to her face, and thereafter apply moisturizing or other facial lotion prior to the application of still other cosmetics, such as colorants, powders, or the like. In some cases, these products are not compatible with each other, that is, one product should be used and removed prior to the time another product is used, and therefore, these products should not come in contact with each other prior to usage thereof.

Under these conditions, it may be thought that separate dispensers should be used for each product, or that a dispenser should be cleaned after use with one product and before another product is used therein.

Accordingly, a dispenser unit which might heat and dispense a plurality of products in succession without the need for intermediate cleaning, and without operating in a manner such that the products would contaminate one another, would be highly advantageous.

A dispenser of this type would also be particularly advantageous in the event that plural chambers adapted to heat different products could also be used in common to heat the same product, if indicated by the desire of the user and the nature of the products.

A dispenser unit adapted to heat and dispense cosmetic products should also desirably include sufficient heat capacity within a reasonable physical size to heat normally used amounts of product in a single chamber, or in several chambers, and would desirably be constructed so that the sequence in which the products are directed to one, all or less than all of the chambers need not be determined by manipulations made by the user, but would be determined by inherent or predetermined characteristics of the dispenser, or the container holding the products, or both. An improved heated cosmetic dispenser would also advantageously include means for insuring that the product could be heated sufficiently to be desirable without creating the danger of being overheated, and would provide means for guiding the hand or fingers of the user in relation to the product outlet so that the unit could be favorably and conveniently manipulated without the exercise of a great deal of skill.

Moreover, any such unit of this type would advantageously be relatively simple, rugged, inexpensive and relatively free from the hazards of fire, electrical shock or the like, particularly under the conditions normally expected to be encountered in the use of such unit, and to embody many or all of such features in a device which is esthetically pleasing and simple to load and unload.

Accordingly, in view of the foregoing desirable features of a dispenser for heating and dispensing cosmetic and other products, and in view of the failure of prior art devices to provide some or all of these advantages and characteristic features, and other desired features, it is an object of the present invention to provide an improved dispenser for heating and dispensing cosmetic products.

It is a further object to provide a heating dispenser having plural heating chambers which may be used individually or in common for heating a particular product.

A further object is to provide such a unit having means thereon for preventing undesirable discharge therefrom of steam, overheated water or the like created as an incident to heating the product prior to use thereof.

A further object is the provision of a dispenser having an improved electrical heating system, including means for locating and retaining the electrical appliance cord in relation to the electrical components of the dispenser to provide ease of assembly, maximum mechanical strength and waterproof electrical insulation.

A further object is to provide a dispenser having a relatively massive heat sink, whereby heat sufficient to warm a desired amount of product may be stored at a reasonable temperature.

A further object is to provide a system of chambers and passages adapted to direct products from a container outlet nozzle into one or more preselected particular heating chambers and thereafter to a product discharge outlet.

A further object is the provision of an improved heat sink assembly incorporating means for directing a fluent product in a desired path and heating the same to a desired temperature.

A still further object is the provision of a dispenser which is constructed and arranged to facilitate manipulation thereof and adapted to aid in positioning of the hands or fingers of the user so as to receive the product dispensed therefrom.

A further object is the provision of a heat sink or heat exchanger assembly having means associated therewith for directing the product along a plurality of surfaces thereof for absorbing heat therefrom in a most effective manner.

A further object is to provide a product container having a dispensing nozzle associated therewith which is characterized by outlet passages adapted for cooperation with other parts of the dispenser to determine the path the product held in such container will take while passing through one or more heating chambers of an associated dispenser.

A still further object is the provision of a dispenser constructed of economical but durable materials, and which is constructed and arranged so as to be economically producted and assembled.

The invention is directed, in a product dispenser of the type including an electrical resistance heating element, and a heat storage element in thermal communication with the heating element and having on an outer surface thereof at least one open channel having an inlet and an outlet for receiving the product, to a cover assembly for the channel comprising a first member of relatively thin synthetic plastic material adapted to withstand the temperature of the product to be dispensed and dimensioned to overlie the channel, a second member of relatively thick flexible material coextensive with and superimposed over the first member, and means for urging the second member into closely overlying relationship to the outer surface of the heating element whereby the first member is urged into sealing engagement with the margins of the channel to form a heating chamber for the product.

The exact manner in which these and other inherent objects and advantages of the invention are achieved in practice will become more clearly apparent when reference is made to the accompanying detailed description of the preferred embodiments of the invention, and to the accompanying drawings, in which like reference numerals indicate corresponding parts throughout.

DESCRIPTION OF THE PREFERRED EMBODIMENTS OF THE INVENTION

Although it will be appreciated that the principles of the present invention may be applied to a number of different forms of dispensing units, the invention will be described with particular reference to exemplary embodiments wherein the dispenser unit receives a pressurized container in an upper portion thereof, wherein the product is discharged under pressure from the container and thereupon passes through an inlet area to one or more heating chambers within a heating assembly to emerge from associated dispensing openings disposed in the lower portion of the unit.

Figure 1:
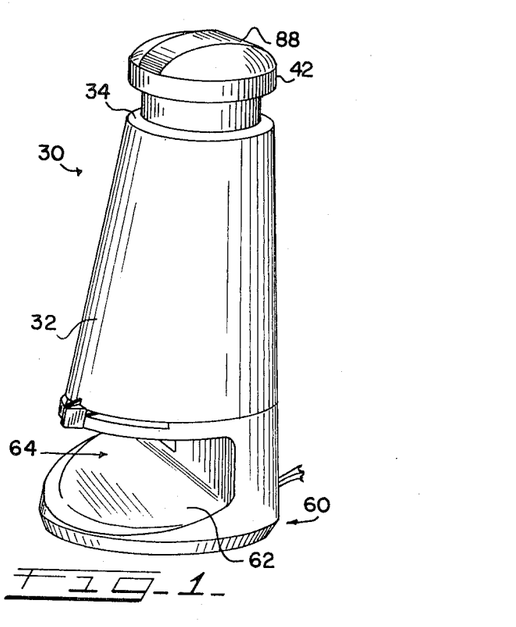
FIG. 1 is a perspective view of the dispenser of the invention with a product container received therein in position of use.
Figure 2:
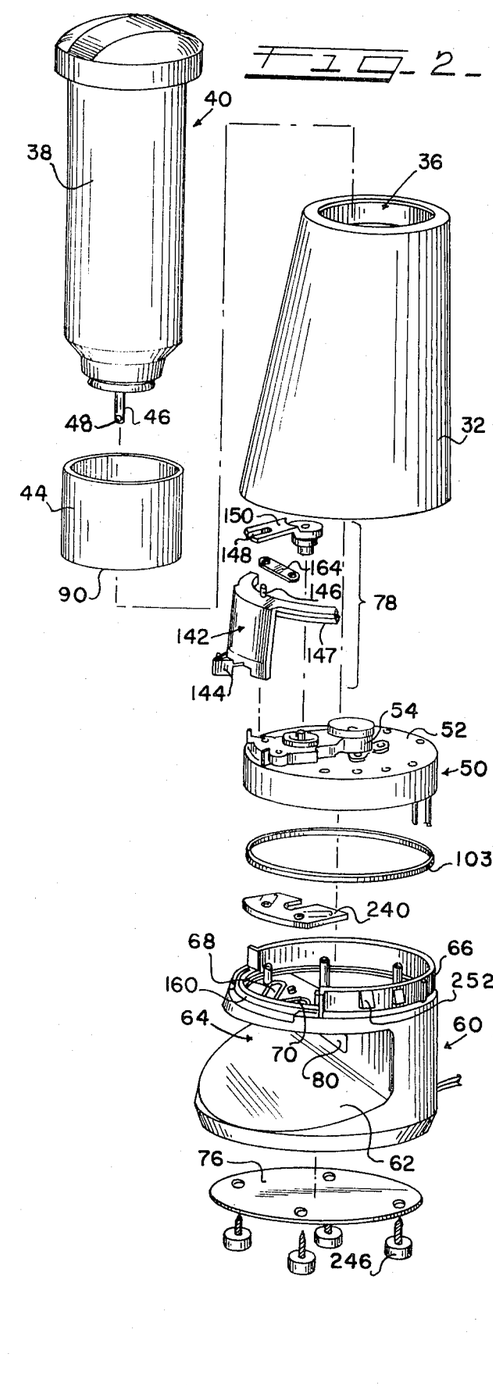
FIG. 2 is an exploded perspective view of the dispenser and container of the invention, showing certain of the principal elements thereof.
Figures 4, 5, 6:
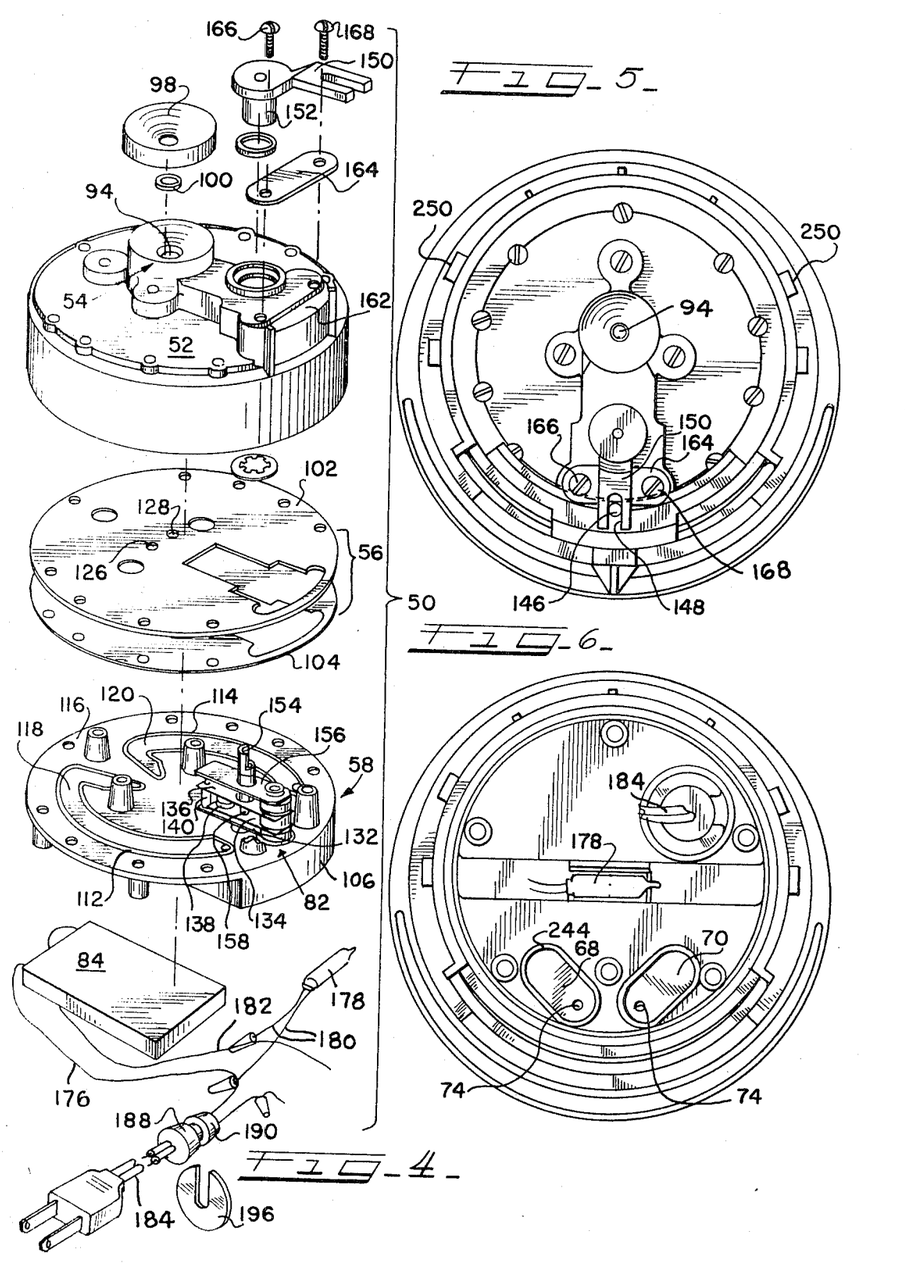
FIG. 4 is an exploded perspective view of the product receiving and heating assembly of the invention.
FIG. 5 is a horizontal sectional view of the dispenser unit, showing a top view of the product receiving and dispensing unit and taken along lines 5—5 of FIG. 3.
FIG. 6 is a horizontal sectional view of the dispenser, showing the principal elements of the base portion of the dispenser and taken along lines 6—6 of FIG. 3.

Referring now to the drawings in greater detail and in particular to FIGS. 1 and 2, a dispenser unit 30 according to the invention is shown to include a skirt portion 32 of generally inverted frusto-conical shape, and having an upper margin 34 thereof defining an opening 36 in which the major portion of the body 38 of an associated container unit 40 is received. Characteristically, the container 40 includes a top cover 42 and a lower cover or overcap portion 44 which is removable, and which, when the container is stored, covers a nozzle 46 having one or more openings 48 through which the product is dispensed. Disposed within a lower portion of the skirt 32 is a product receiving and heating assembly 50 generally shown in FIG. 2. As shown in FIG. 4, this assembly 50 includes a product receiving and heating assembly cover element 52 having an inlet body portion 54, a two-piece gasket assembly 56 and a heat sink assembly 58. As will be set forth in further detail herein, the inlet portion 54 of the product receiving and heating assembly 50 includes means for directing the product to one or more heating chambers within the assembly 50 either simultaneously or sequentially.

Another major portion of the unit 30 is the base 60 (FIGS. 1 and 2) which includes wall portions 62 defining a re-entrant portion 64 therein for reception of the user's hand or fingers, and an upper portion 66 adapted to engage the lower portion of the skirt 32 in a locking relation. Another principal element of the base 60 is the means in the form of two or more outlet passages 68, 70 for connecting the product outlets 72 in the heat sink assembly 58 to the product outlets 74 (FIG. 6) in the base. The purpose of passages 68, 70 will be set forth in detail as the description proceeds. In addition to a bottom cover plate 76, the dispenser unit 30 also includes control means 78 for the heater, and a window 80 for viewing an indicator showing that the heater is in operation. The heat sink assembly 58 also includes a thermostatic control unit 82 (FIG. 4) and a heating element 84, the construction of which will be described in further detail herein. A novel electrical connector assembly 86 (FIG. 17), which will be described in detail herein, is provided for adding structural integrity and water resistance to the electrical elements of the dispenser 30.

Referring now in particular to the container 40, it will be noted that the top cover 42 contains a rounded top surface portion 88, and that the overcap 44 contains a flat bottom surface portion 90. Thus, the container 40 with the overcap 44 thereon will stand without external support in the inverted position when not received in the dispenser 30 and cannot be stored upright without external support. The container 40 is constructed in this manner because, inasmuch as the product to be dispensed is normally somewhat fluent but still highly viscous, and since the product flows into the nozzle 46 from the portion of the container most closely adjacent thereto, it is essential that the container be stored in the inverted position, at least for some time prior to use thereof. On the other hand, if the container 40 were stored with the valve nozzle 46 directed upwardly, the product would settle in the lowermost portion of the can and, if the container 40 were then placed in the dispenser unit 30 and the valve 46 immediately actuated, the propellant gas would undesirably escape from the nozzle 46 prior to the time product would have an opportunity to flow downwardly in the can to the area adjacent the valve.

This contingency is therefore conveniently avoided by sufficiently rounding the top surface 88 of the cover 42 so that the container 40 will not stand upright without support, and by providing a flat surface 90 on the overcap 44, thus assuring that the container is not inadvertently stored in the upright position.

Figures 3, 7, 8:
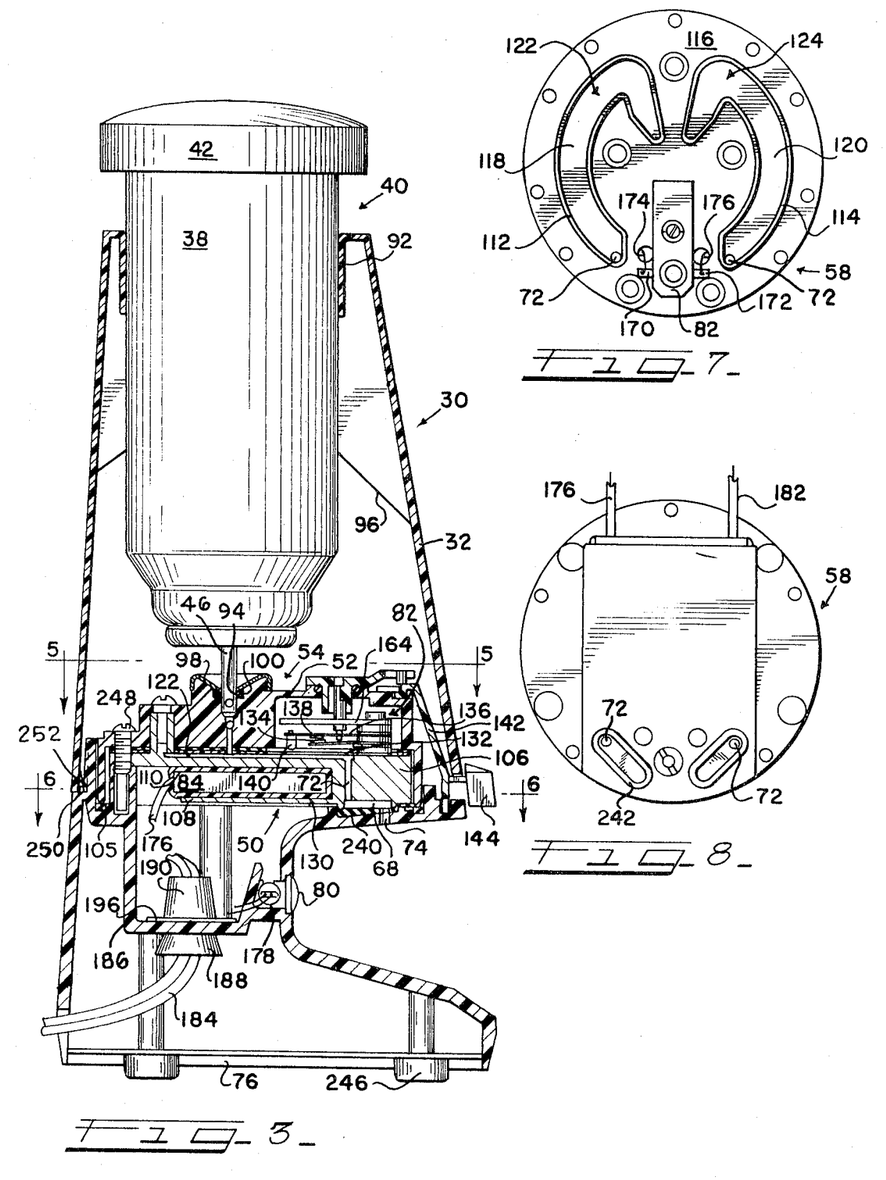
FIG. 3 is a vertical sectional view through the dispenser unit of the invention, showing a product container associated therewith in position of use.
FIG. 7 is a top plan view of the body of the heat sink of the dispenser.
FIG. 8 is a bottom plan view of the heat sink of FIG. 7.

Referring now to FIGS. 2–8, a number of the other features of the construction of the dispenser unit 30 will be described. Referring particularly to FIGS. 3 and 4, it will be noted that the skirt 32 includes an inner, generally cylindrical collar 92 for guiding the container body 38 so that the nozzle 46 will be in at least an approximate position of registry with the opening 94 (FIG. 4) in the inlet body portion 54 of the product receiving and heating assembly 50. A plurality of ribs 96 (FIG. 3) are also provided and extend inwardly from the skirt 32 to provide additional stiffness therefor. The inlet body portion 54 is surmounted by a generally inverted frusto-conical metal cover 98 which serves to guide the nozzle 46 into the opening 94, and also serves to hold the O-ring 100 in place within the body 54. Disposed below the inlet body 54 is a gasket assembly 56 comprised of an upper, relatively resilient gasket 102, preferably formed of rubber or the like, and a thin, lower gasket 104 formed of a relatively inert material such as "Mylar" (polyethylene terephthalate) or the like.

Beneath the gasket assembly 56 is the heat sink assembly 58 which includes the thermostat unit 82 as well as a heat sink body 106 (FIG. 3) having lower wall portions 108 defining a recess 110 for receiving the heating element 84. As shown in FIG. 4 and FIG. 7, for example, pairs of lands 112, 114 extend upwardly from the upper surface 116 of the heat sink body 106 to define on the interior thereof a pair of heating chamber wall surfaces 118, 120 forming the bottom walls respectively of a pair of heating chambers 122, 124, (FIG. 7) the top surfaces of which are defined by the lower surfaces of the Mylar lower gasket 104. At one end of each chamber 122, 124, is a heat sink product outlet 72, while passages formed in part by openings 126, 128 (FIG. 4) in the gasket assembly 56 provide inlets to the heating chambers 122, 124. Accordingly, it will be seen that the body 106 of the heat sink assembly 58 includes means for directing a fluent product along a path of relatively great surface area and through openings or outlets adapted to communicate with the ultimate product outlets 74 (FIG. 3).

Referring now to another feature of the invention, it will be noted that current flow to the heating element 84, which is preferably potted in place within the recess 110 with a thermally conductive cement 130 (FIG. 3) is controlled by the thermostat 82. The thermostat 82 is conventional and includes a flexible bimetallic lower element 132, a pair of blades 134, 136 having contact point portions 138 respectively thereon, with the element 132 having at one end thereof an electrically insulating post 140 contacting an end of the upper blade 136. Accordingly, upward movement of the end of the element 132 will raise the end of the blade 136 upwardly a sufficient amount to open the contact points 138, thereby interrupting current flow into the heating element 84. On the other hand, any temperature which is insufficient to cause bending of element 132 to this extent will permit continued current flow in the element 84 so as to maintain or increase the temperature in the heat sink body 106. In the illustrated embodiment (FIG. 2), the thermostat control assembly 78 includes a thermostat actuating slide 142 having an indicator 144 thereon, an arcuate upper guide portion 147 and a post 146 which is adapted to be received in the slot 148 of a pivoted yoke 150. A keyed end portion 152 (FIG. 4) on the yoke 150 registers with a notched sleeve 154 which passes through a threaded opening in a rigid arm 156 forming a part of the thermostat 82. The lower end portion 158 of the sleeve 154 engages the lower blade 134 of the thermostat 82, so that the degree of movement of bimetal element 132 and the upper blade 136 necessary to opening the contact points 138 may be changed to establish the temperature to which the product will be heated, in keeping with the preference of the user, and the nature of the product being used. Accordingly, moving the indicator 144 (FIG. 2) arcuately from side to side will move the yoke 150 and raise or lower the blade 134 in the thermostat 82. The actuator slide is received along the lower portion thereof in a slot 160 in the base 60, and the upper portion 147 of the slide is guidingly received in a relieved portion of heating assembly cover 52. The metal cover plate 164 held over the cover 52 by fasteners 166, 168 (FIG. 4) overlies one of the surfaces defining the upper portion 147 of the actuator slide 142, forming a slide way for the slide 142.

Referring now to other electrical components of the invention, FIG. 7 shows that a pair of ears 170, 172 are provided for receiving conductors 174, 176 which are associated respectively with one of the lead-in wires extending to the connector assembly 86, and with one of the leads to the heating element 84. An indicator light 178 (FIG. 3), which is disposed in use behind the lens 80 has thin leads 180 attached thereto across or parallel to the heavier wires 176, 182 leading to the heating element 84. Thus, the thermostat is in series with the heating element, and the indicator light 178 is parallel to the element 84 but is also in series with the thermostat.

Another important feature of the electrical system of the invention is the manner in which the cord 184 is secured in place within the bottom wall 186 of the base 60 by the connector assembly 86 to provide proper electrical connections to the lines 176, 182 (FIG. 4).

Figure 17:
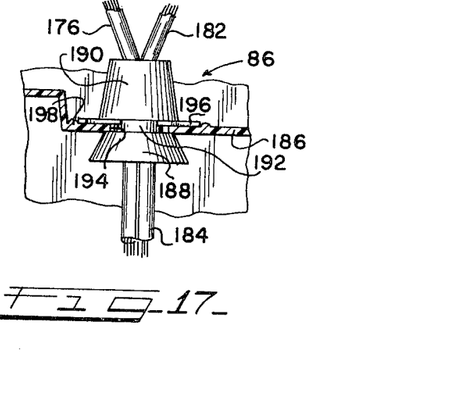
FIG. 17 is an enlarged vertical sectional view of a portion of the electrical connector used with the invention.

Referring in particular to FIGS. 3, 4 and 17, it will be noted that this connector assembly 86 includes a stiff but resilient outer segment 188, and a similarly constructed inner element 190 joined to the element 188 by a reduced diameter neck portion 192. The exterior insulating portions of the cord 184 is bonded to the elements 188, 190, 192 in an electrically insulating, mechanically strong and water-tight relation. The neck 192 is snugly received by walls 194 defining an opening in the wall 186, while a stiff, generally U-shaped clip 196 is wedged between an axially facing surface of the element 190 and the inside surface of the wall 186. A circular ridge 198 prevents the clip 196 from being removed, and a liquid-tight seal is thus provided between an axial inner face of the element 188 and the outer surface of the wall 186. Thus, this construction is simple and inexpensive, but it provides the simultaneous features of waterproofing, freedom from the likelihood of unlocking, and great mechanical strength, so that pulling forces on the cord 184 are not transmitted to any of the more delicate interior electrical connections.

Figure 9:
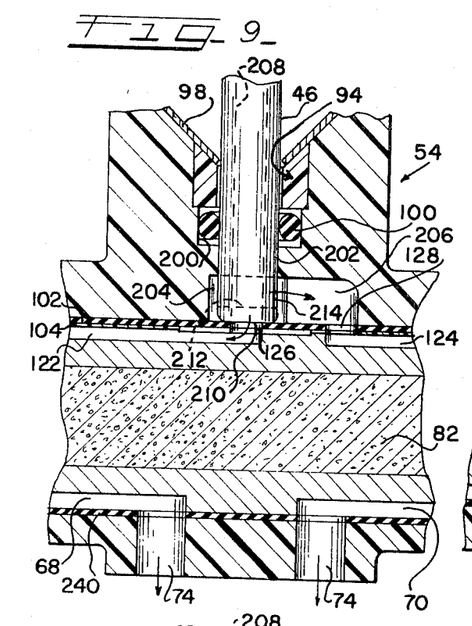
FIG. 9 is a greatly enlarged fragmentary vertical sectional view of one embodiment of the container nozzle and product inlet body of the invention.

Referring now to other important construction features of the dispenser unit 30, FIG. 9 shows an embodiment of the product inlet body portion 54 of the cover 52 wherein the nozzle portion 46 of an associated container 40 is received in an axially extending opening 94 which includes means in the form of an O-ring 100 adapted to engage the nozzle 46 in a snug relation. As shown, this ring 100 is snugly received within an annular groove 200 within the opening 94.

Located beneath a reduced diameter portion 202 of the opening 94 is an annular groove 204 communicating with a passageway 206 which terminates in one product heating chamber 124. As shown in dotted lines in FIG. 9, a bore 208 extends axially of the nozzle 46 to allow passage of product therethrough, with the passage 208 having an axial end opening 210 therein and a radially extending passage 212 intersecting the bore 208 and terminating in a radially directed opening 214 therein. It should be understood that, in use, the nozzle 46 will always include the bore 208, but that this bore may be provided only with an axial outlet 210, or only with the radial outlet 214, or with both outlets 201, 214, for reasons which will now be set forth. As shown in FIG. 9, chamber 122 communicates with the openings 126 in the gasket assembly 56, the openings 126 defining, at least in part, a passage to the chamber 122. In keeping with the invention, assuming that the nozzle portion 46 of a container is positioned as shown, there is no communication between chambers 124 and 122, except communication which might be established by way of the passage 208 and the openings 210, 214. Accordingly, assuming that only the opening 210 is provided, any product flowing through passage 208 would be discharged into chamber 122 and chamber 124 would not receive any product, since passage 206 and the annular groove 204 are totally blocked by the exterior walls of the nozzle 46.

On the other hand, assuming that outlet 210 is not present, but that only radially directed openings 214 is provided, any product passing through the axial bore 208 would flow through passage 206 and into chamber 124, while the bottom portion of the nozzle 46, being imperforate in this example, would block access to chamber 122. Under the foregoing circumstances, it can be seen that, in the first case, product would pass into chamber 122 and out the left hand product dispensing opening 74 only, while, in the second case, product would pass through chamber 124 and out the right hand product outlet opening 74. On the other hand, a nozzle 46 having both radial and axial outlets 210, 214 would permit product to flow simultaneously into both chambers 122, 124 and simultaneously out both openings 74. From the foregoing, it will be seen that the construction of the product inlet assembly so as to have plural individual passages, each adapted to communicate with an individual chamber and adapted at the opposite ends thereof to register only with a particular portion of the nozzle-receiving opening, makes it possible to dermine in advance whether one or more chambers will be used to heat the product, and which of the several chambers will be used for this purpose, merely by the location of the openings in the container nozzle 46. Therefore, the paths to be taken by the individual products may be coded or programmed in such a way that there will be no possibility of antagonistic products being passed into the same chamber. Furthermore, the dispensing volume may be controlled by providing a multiple outlet nozzle for products desired to be dispensed in higher volume, and single outlet nozzles for products desired to be dispensed in lower volumes, all without altering the rate at which the products pass through the individual heating chambers.

Figure 10:
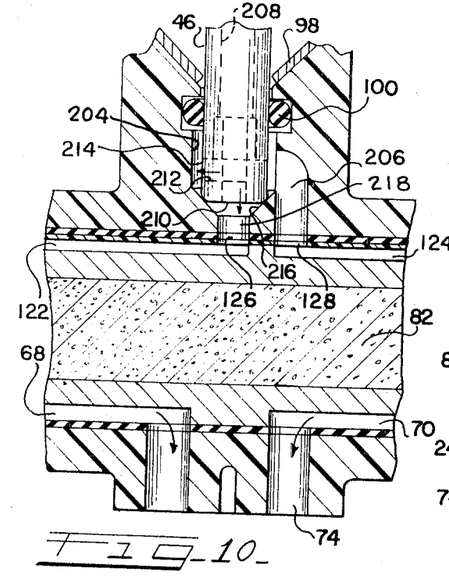
FIG. 10 is an enlarged vertical sectional view of another form of container nozzle and product inlet body of the invention.

Referring now to FIG. 10, an embodiment is shown wherein the elements are similar to their counterparts in FIG. 9 except that a tapered shoulder 216 forms a part of the passage 218 associated with the heating chamber 122. Accordingly, this shoulder 216 forms a good seal with the end portion of the nozzle 46 and provides resistance to axial movement of the nozzle 46 so that a force applied axially to the cam will move the can relative to the nozzle an actuate the container valve for dispensing purposes. In this embodiment, it will be noted that since the groove 204 extends fully around the nozzle 46 there will be communication between the bore 208 of the nozzle 46 and the passage 206 enen through the radial outlet 214 is disposed oppositely to or out of registry with the passage 216. In this manner, it is not necessary to orient the container before inserting it into the opening 36 in the skirt 32. The embodiment of FIG. 10 is advantageously used with nozzles having axial openings only, radial openings only, or both, and the function thereof is the same as the functioning of the embodiment shown in FIG. 9.

Figure 11:
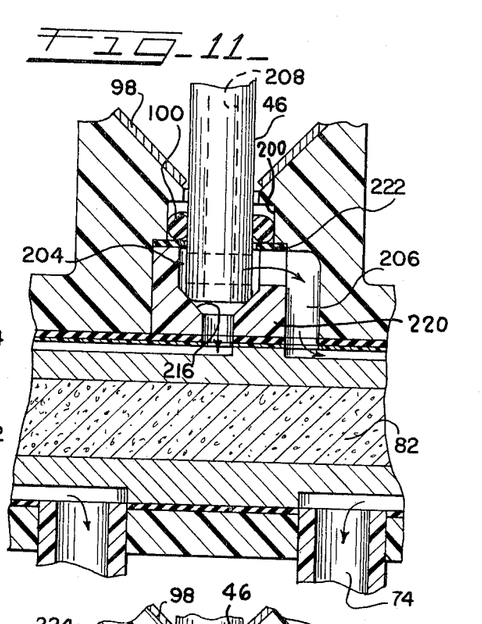
FIG. 11 is a greatly enlarged fragmentary sectional view of another form of container nozzle and product inlet body of the invention.

FIG. 11 shows a construction wherein an insert nozzle seat 220 having a shoulder 216 therein is provided, and this illustration shows a construction wherein an annular gasket 222 provides a seal between the groove 200 receiving the O-ring 100 and the groove 204 forming a part of passage 206.

Figure 12:
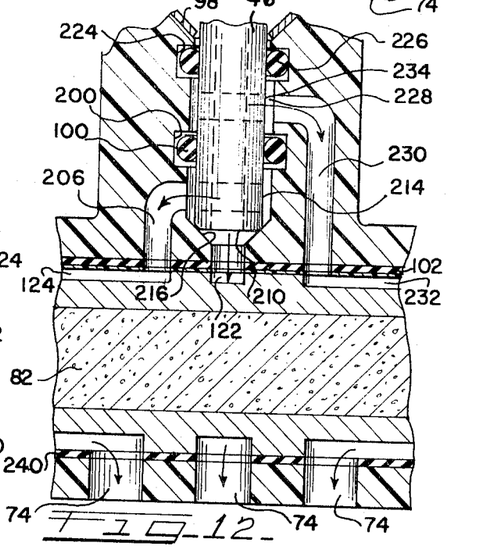
FIG. 12 is a greatly enlarged fragmentary sectional view of a still further modified form of container nozzle and product inlet body of the invention.

Referring now to FIG. 12, it will be noted that, in addition to the groove 200 and the O-ring 100, a second groove 224 having an O-ring 266 therein is provided, and that a third annular groove 228 has been constructed for registry with a third passage 230 which extends to and communicates with a third heating chamber somewhat schematically shown at 232. In this illustration, passages 206 and 218 are shown respectively to be associated with heating chambers 124 and 122. In any or all of the constructions shown in FIGS. 9–12, the cover 98 may form the top portion of the body 54 and may serve to retain the ring 100 in place. The function of the product inlet assembly of the type shown in FIG. 12 is the same as that of the embodiment thereof shown in FIGS. 9–11, except that a second radial passage 234 is provided in the nozzle 46, and the heat sink assembly 58 may be equipped with a third chamber. It will be apparent that, in this form of construction, a number of nozzle configurations may be provided so that the product may be directed to one chamber, two chambers or three chambers, and that three different combinations of two chambers may be provided for, that is, a product might pass through first and second chambers, only first and third chambers only, or second and third chambers only. The other features inherent in the construction of the counterparts of the elements shown in FIG. 12, such as the feature of control of dispensing rate, etc., are also inherently associated with the construction of FIG. 12, and it may be appreciated that any reasonable number of other passages may be provided for communication between nozzle outlets and heating chambers associated with passages disposed in the nozzle receiver 94.

Figure 13:
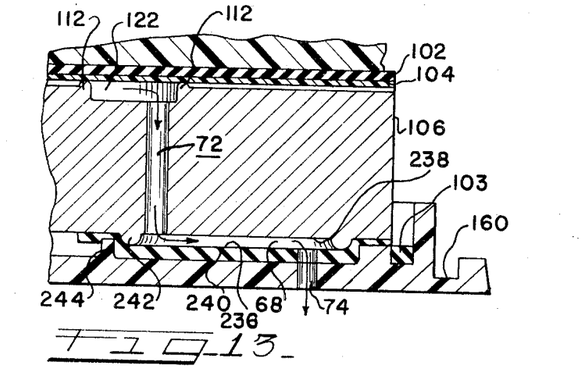
FIG. 13 is a greatly enlarged vertical sectional view of the product outlet passage portion of the unit.

Referring now to another important feature of the dispenser of the invention, FIG. 13 shows in detail the construction of a preferred form of product outlet passage 68 which is disposed between the heat sink product outlet 72 and the product outlet 74 in the base. It will be understood that the outlet passage 70 is constructed and arranged in the same manner as the passage 68, and that, if additional passages are provided, they may be constructed in the same manner. This passage 68 is shown to be defined by an upper surface 236 of an absorbent gasket 240 and the lower surface portion 238 of the heat sink body 106. The gasket 240 is held firmly in place between lands 242 fromed on the lower surface of the heat sink body 106, and extending downwardly therefrom, and generally congruent but larger lands 244 extending upwardly from the base 66 and also partially defining the chamber 68. Thus, referring to FIGS. 6 and 8, it will be noted that the lands 242, 244 are disposed on surface which are oppositely directed in use, whereby, as the heat sink body 106 is forced downwardly into a snug, closely overlying relation to the base 66, the gasket 240 is held firmly by a combination compressing and wedging action between the pairs of lands 242, 244. In use, the chambers 68, 70 serve the purpose of reducing or eliminating the possibility that steam will inadvertently be dispensed from the outlet 74, or that highly fluent, overheated materials, including water, will be dispensed, with the attendant risk of discomfort or harm to the user. Accordingly, these chambers may be considered in one sense as steam or vapor traps. Typically, in use, the product outlet passages 68, 70 provide an expansion chamber effect permitting the entry velocity of the product being dispensed to be reduced as it passes through the chamber. Furthermore, the increased surface area of the passages 68, 70 affords an opportunity for water vapor or the like to condense, and condensation is also favored by the directional changes required for the product to traverse the outlet 72 the chambers 68, 60 and the outlets 74. In addition, the gasket 240, which is preferably of a sponge rubber or other porous material, helps to condense and absorb vapors. It has been found that very thin, fluent products, such as water, are more easily absorbed into the sponge gasket 240 than are viscous, less fluent products, and once the more fluent product is absorbed, its rapid passage toward the outlet opening 74 is substantially impeded or stopped. Accordingly, water and steam which might be separated from an emulsified product for example, tend to be separated from and/or cooled in these passages 68, 70 in relation to the remainder of the product. Thus, the construction of these or similar forms of product outlet passages is an important feature of the invention. Referring again to FIG. 13, it will be noted that the two gaskets 102, 104 are disposed in a closely overlying relation, and that one of the product chambers 122 lying upstream of passage 72 is defined by lands 112, which extends somewhat circuitously along the top surface 118 of the heat sink body 106.

Referring now to FIG. 3, certain other features of construction of the dispenser of the invention and the operation of the dispenser are shown for easy understanding thereof. Thus, as shown in FIG. 3, the base unit 60 supports the assembly which rests on feet 246, preferably made of rubber or the like. The cover 52 is held snugly in place over the body 106 of the heat sink assembly 58 by fastening means in the form of screws 248. In this manner, the gasket 102, 103 and 104 are tightly compressed and the heating chambers 122, 124 are partially defined in this manner. The actuator slide 142, the yoke 150 and the associated components are fixed in relation to the thermostat assembly by the fasteners 166, 168 (FIG. 4) and by the above described engagement of the portions of the slide 142 with portions of the base 60 and the cover elements 52. The skirt 32 is snapped into position over the base by engagement of snaps 250 (FIG. 3) on the lower portions thereof with the projections 252 (FIG. 2) on the upper portion 66 of the base 60.

In the use of the dispenser, the lower portion of the nozzle 46 rests on the shoulder 216 within the inlet body 54, whereby the container 40 is supported by the nozzle 46. When it is desired to dispense the product, downward force is manually exerted on the top cover 42 of the container 40, thereby actuating the container valve and allowing product to be dispensed therefrom. For purposes of illustration, it will be assumed that the nozzle 46 includes an axially facing central opening 210 permitting the product to flow therethrough and into one of the chambers 122 as well as a radially directed opening 214 permitting the product to flow into another chamber 124. The gasket ring 100 prevents the product from flowing upwardly over the cover 98. Assuming that the heating element 84 has been energized, and that the heat sink body 106 has attained the desired temperature, the product, under the pressurizing force of the propellent in the container 40 is pushed rapidly through the chambers 122, 124 which are of narrow cross section and which have significant portions of their surfaces formed by the top surface 118, 120 of the heat sink body 106. Thereafter, the product flows vertically through the body outlet 72 and into the passages or expansion chambers 68, 70 and out the dispensing openings 74. During the time the heating element 84 is energized, the light 178, which may be viewed through the window 80, is illuminated. Temperature adjustments are made by manipulating the indicator 144 on the thermostat actuating slide 142.

In the event that only one, or less than all possible openings 210, 214, 234, are provided in the nozzle 46, only the chamber or chambers associated with the passage or passages in registry with the opening will be used. Removal and replacement of such container with another container having different outlet configuration will result in the use of a different chamber or combination of chambers.

Figure 14:
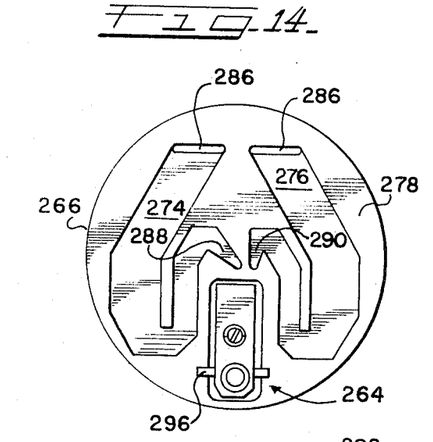
FIG. 14 is a top plan view of another form of heat sink which is useful with the dispenser of the invention.
Figure 15:
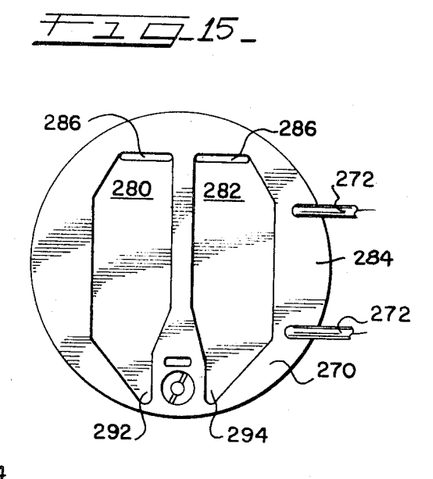
FIG. 15 is a bottom plan view of the heat sink of FIG. 14.
Figure 16:
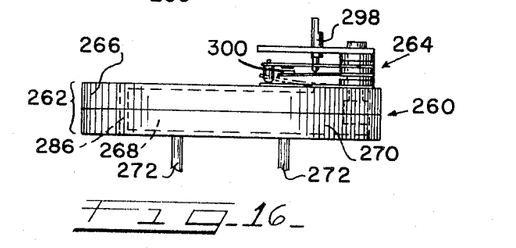
FIG. 16 is a side elevational view of the heat sink unit of FIGS. 14 and 15, showing the thermostatic control associated therewith.

Referring now to FIGS. 14–16, a different form of heat sink assembly 260 is shown. In this construction, a two piece heat sink body 262 is provided, which has a thermostat assembly 264 disposed atop the upper half 266 thereof. In this embodiment, however, the heating element 268 is held between upper and lower pieces 266, 270 of the body, and electrical leads 272 supply current to the element 268. In the construction of FIGS. 14–16, the path taken by the products is somewhat elongated in relation to the path taken by products passing along the heat sink of the form shown in FIGS. 7 and 8, for example. In particular, the product chambers are defined not only by upwardly facing recessed surfaces 274, 276 forming a portion of the heat sink top surface 278, but also by downwardly facing recessed surfaces 280, 282 lying on the bottom surface 284 of the lower piece 270. A vertically extending passage 286 is provided for each of the chambers in order to connect the surface 274 to the surface 280, and the surface 276 to the surface 282, for example. Referring to FIG. 14, for example, it will be noted than an elongated travel path for the product is provided since the areas 288, 290 initially receive the product, and the product must then follow the path defined by the recessed surfaces 274, 276 pass through openings 286 and traverse the entire extent of surfaces 280, 282 to reach the areas 292, 294 which lie adjacent the product outlet openings. This form of heat sink may be used in a construction wherein the product has a relatively higher specific heat, or in a construction wherein the heat sink may be desired to be kept at a somewhat lower temperature than in the other form of heat sink. This construction may also be desired in the event that a foam or other expansible product is dispensed and wherein it is desired to provide heated surfaces for contacting the product during or after expansion thereof to compensate for the heat absorbed in product foaming or the like. In other respects, the modified form of heat sink assembly 260 is generally similar to its counterpart shown in FIGS. 7 and 8, that is, the thermostat assembly 264 also includes ears for receiving electrical connectors, and an adjustment screw 298 is provided for adjusting the initial clearance between the electrical contact points 300 to adjust the temperature at which the heating element 268 is energized and de-energized.

Although the material from which the various elements of the dispenser are made do not form an essential part of the invention, certain materials are advantageously used in the construction of the containers and the dispensers of the invention. The aerosol or other pressurized container is of conventional construction, and the top cover 42 and the lower cover 44 are normally made of inexpensive thermoplastic materials. The skirt 32 may be comprised of a high impact polystyrene or modified polystyrene material. The base unit comprises a moldable thermoplastic material, such as a General Electric "Noryl" resin, and the heat sink cover 52 may be made of the same or similar material. The heat sink body 106 is preferably die cast aluminum, while the heating element 84 is typically a high resistance electrical wire material such as "Nichrome" encased within a ceramic material having high dielectric strength. The bottom cover 76 may be a zinc plated steel, while the actuator slide 142, yoke 150 and the like are preferably made of a strong synthetic plastic material such as a polycarbonate, an acetal, or the like.

The thermostat and other electrically conductive elements are preferably made from steel, while the upper gasket 102 is a rubber material such as Neoprene, the lower gasket 104 is Mylar, and the ring gasket 103 disposed in the groove 105 may also be a Neoprene material. The connector assembly 86 is preferably a rubber or rubber-like material while the non-metallic portions of the appliance cord 184 are preferably polyvinyl chloride. In one embodiment, the unit is operated on 110 volt alternating current, although the unit may operate effectively at other ratings and may be adapted to operate on direct current if desired.

As pointed out above, the dispenser of the invention is advantageously adapted to heat and dispense creams, jellies, emulsions and the like, as well as foamed or foamable products suitable for a wide variety of uses. Such products include but are not limited to women's cosmetic products, such as skin creams, moisturizers, and products used in facial treatment generally, as well as other cosmetic products, medical first aid products and other products.

Whereas, the unit operates excellently with non-foamed products, the design of the unit of the invention is such that it also operates very well with foamed and foamable products, including shaving preparations and the like, and also including compositions having blowing or foaming agents therein, even whose rate of evaporation may be significantly or greatly increased by the application thereto of raised temperatures.

From a consideration of the foregoing detailed description of the preferred embodiments of the invention, it may be seen that the present invention provides a novel dispenser, container, and method having a number of advantages and characteristics, including those herein pointed out and others which are inherent in the invention. It will also be apparent that various modifications and changes may be made by those skilled in the art without departing from the spirit of the invention or the scope of the appended claims.

We claim:

1. In a product dispenser of the type including an electrical resistance heating element, and a heat storage element in thermal communication with said heating element and having on an outer surface thereof at least one open channel having an inlet and an outlet for receiving said product, the improvement comprising a cover assembly for said channel comprising, in combination:

a first member of relatively thin synthetic plastic material adapted to withstand the temperature of the product to be dispensed and dimensioned to overlie said channel;

a second member of relatively thick flexible material coextensive with and superimposed over said first member; and means for urging said second member into closely overlying relationship to said outer surface of said heating element whereby said first member is urged into sealing engagement with the margins of said channel to form a heating chamber for said product.

2. A cover assembly as defined in claim 1 wherein said first member is formed of polyethylene terephthalate and said second member is formed of a rubber material.

* * * * *

UNITED STATES PATENT OFFICE
CERTIFICATE OF CORRECTION

PATENT NO. : 3,846,614
DATED : November 5, 1974
INVENTOR(S) : Edward J. Doyle and Richard S. Bagwell, Jr.

It is certified that error appears in the above-identified patent and that said Letters Patent are hereby corrected as shown below:

In column 7, line 64, "201" should be --210--
In column 8, line 56, "cam" should be --can--
In column 8, line 61, "enem" should be --even--
In column 8, line 62, "through" should be --though--
In column 8, line 63, "216" should be --206--
In column 9, line 11, "266" should be --226--
In column 9, line 60, "surface" should be --surfaces--
In column 10, line 42, "gasket" should be --gaskets--
In column 11, line 7, "surface" should be --surfaces--

Signed and Sealed this twenty-sixth Day of August 1975

[SEAL]

Attest:

RUTH C. MASON
Attesting Officer

C. MARSHALL DANN
Commissioner of Patents and Trademarks